United States Patent [19]

Moriya et al.

[11] 4,441,031
[45] Apr. 3, 1984

[54] POWER SOURCE VOLTAGE CHANGE DISCRIMINATION CIRCUIT

[75] Inventors: Yoshiaki Moriya, Tokyo; Ryo Mitani, Kawasaki; Atsushi Kobayashi, Tokyo, all of Japan

[73] Assignee: Tokyo Shibaura Denki Kabushiki Kaisha, Japan

[21] Appl. No.: 329,058

[22] Filed: Dec. 9, 1981

[30] Foreign Application Priority Data

Dec. 10, 1980 [JP] Japan .................. 55-174258

[51] Int. Cl.³ .............................. H02J 9/00
[52] U.S. Cl. ........................... 307/66; 307/46
[58] Field of Search ............ 307/66, 64, 23, 46, 307/48

[56] References Cited

U.S. PATENT DOCUMENTS 4,122,359 10/1978 Breikss .................. 307/64
4,323,820 4/1982 Teich ..................... 307/66

OTHER PUBLICATIONS

Box I, C. J. Ulrick, EEE Magazine, Dec. 1970, p. 54, "Schmitt Trigger Uses Two Logic Gates."
Box II, B. Brocker, Motorola, Phoenix, AZ., 1974, AN-53646, "Micro-T Packaged Transistors for High Speed Logic Systems."

Primary Examiner—E. A. Goldberg
Assistant Examiner—Derek Jennings
Attorney, Agent, or Firm—Finnegan, Henderson, Farabow, Garrett & Dunner

[57] ABSTRACT

A power source voltage change discrimination circuit includes a voltage selection circuit for selectively supplying the greater one of main and auxiliary power source voltages, and a series circuit of a resistor and a capacitor coupled between the output terminal of the voltage selection circuit and ground. There is further provided a Schmitt circuit having hysteresis characteristics whose input terminal is coupled to a junction of the resistor and capacitor.

6 Claims, 9 Drawing Figures

POWER SOURCE VOLTAGE CHANGE DISCRIMINATION CIRCUIT

BACKGROUND OF THE INVENTION

The present invention relates to a power source voltage change discrimination circuit.

When a main power source voltage for operating a microcomputer, for example, is interrupted due to power failure or the like, operation results of the microcomputer may be lost. In order to prevent this, a power source voltage change discrimination circuit is conventionally known which supplies an auxiliary power source voltage to the microcomputer at such an instant and which changes an output voltage from the auxiliary power source voltage to the main power source voltage when the main power source voltage is restored. FIG. 1 shows a microcomputer system which has a power source voltage change discrimination circuit of this type. This power source voltage change discrimination circuit has a voltage selector 2 which selectively supplies the voltage from a main power source 4 or an auxiliary power source 6 to a power source terminal of a microcomputer 8, and a reset circuit 10 which supplies a reset signal to the microcomputer when the main power source 4 is turned on.

Assume that both the main power source 4 and the auxiliary power source 6 are turned on, and the power source voltage from the main power source 4 is supplied to the microcomputer 8 through the voltage selector 2. In this case, the microcomputer 8 is supplied with the power source voltage which increases from 0 V to a main power source voltage VM, and is thereafter held at this voltage VM, as shown in FIG. 2.

When the power source voltage supplied to the microcomputer 8 changes from 0 V to the voltage VM, the reset circuit 10 generates a reset signal for a predetermined period of time to reset the microcomputer 8 to the initial state. On the other hand, if the main power source voltage is interrupted for some reason during the operative period of the microcomputer 8, an auxiliary power source voltage VA from the auxiliary power source 6 is supplied to the microcomputer 8 through the voltage selector 2. This auxiliary power source voltage VA serves to temporarily interrupt the operation of the microcomputer 8 as well as to prevent loss of data such as the operation results in the microcomputer 8.

If the main power source voltage is restored thereafter, the microcomputer 8 receives the main power source voltage VM to resume its processing operation. In this case, since the power source voltage changes not from 0 V but from VA to VM, the reset circuit 10 does not generate a reset signal. Therefore, the microcomputer 8 is not set to the initial state. However, if the difference between the main power source voltage VM and the auxiliary power source voltage VA is great, that is, if the auxiliary power source voltage VA is close to 0 V, it is difficult for the reset circuit 10 to correctly discriminate if the power source voltage has changed from 0 V to VM or from VA to VM. For this reason, when the power source voltage changes from VA to VM, the reset circuit 10 may erroneously generate a reset signal to set the microcomputer 8 to the initial state.

In order to prevent this kind of erroneous operation of the reset circuit 10, a reset circuit 12 as shown in FIG. 3 is conventionally required which has the function to discriminate if the main power source 4 has been turned on or has been restored. This reset circuit 12 has a series circuit of a resistor 12-1 and a capacitor 12-2 coupled between the output terminal of the voltage selector 2 and ground; a series circuit of a resistor 12-3 and an npn transistor TR1; a pnp transistor TR2, the collector of which is grounded through a resistor 12-4 and is coupled to the base of the transistor TR1, the emitter of which is coupled to the output terminal of the voltage selector 2 through a Zener diode 12-5, and the base of which is coupled to a junction of the resistor 12-1 and the capacitor 12-2; and a diode 12-6 coupled in parallel with the resistor 12-1.

In the circuit shown in FIG. 3, when the main power source 4 is turned on, a high voltage is applied between the emitter and base of the transistor, and the transistor TR2 is rendered conductive. Then, current flows through the Zener diode 12-5, the transistor TR2, and the resistor 12-4 to render the transistor TR1 conductive. Then, a voltage of low level is supplied to the microcomputer as a reset signal, and the capacitor 12-2 is charged at a rate which corresponds to a time constant determined by the resistor 12-1 and the capacitor 12-2. When the charging voltage reaches a predetermined value, the transistor TR2 is rendered nonconductive. Then, the transistor TR1 is also rendered nonconductive and the supply of the reset signal to the microcomputer 8 is interrupted. The reset circuit 12 is so constructed that the time required for the transistor TR2 to be rendered nonconductive after the power source voltage 4 reaches VM is longer than the time required for setting the microcomputer 8 to the initial state.

If the power supply is interrupted temporarily due to power failure or the like after the main power source 4 is turned on, the voltage from the auxiliary power source 6 is supplied to the microcomputer 8. If the main power source voltage is restored thereafter, a voltage which is sufficient to render the transistor TR2 conductive is not applied between the emitter and the base of the transistor TR2 due to the charging voltage of the capacitor 12-2. Therefore, the transistors TR1 and TR2 are kept nonconductive, and the reset signal is not supplied to the microcomputer 8.

With the reset circuit 12 of this type, the discrimination is well made between the case wherein the main power source 4 is turned on and the case wherein the main power source voltage is restored, and the reset operation is well controlled thereby, so that high reliability may be attained. However, the requirement for incorporation of a control circuit of this type makes the entire system costly.

SUMMARY OF THE INVENTION

It is an object of the present invention to provide a power source voltage change discrimination circuit which is capable of correctly discriminating the rising characteristics of the power source voltage and which is simple in construction.

According to an aspect of the present invention, there is provided a power source voltage change discrimination circuit comprising voltage selecting means for generating an output voltage corresponding to a voltage applied to a main power source terminal or an auxiliary power source terminal; a time constant circuit including resistive means and capacitive means which are connected in series between the voltage selecting means and a reference power source terminal; and a Schmitt circuit which has hysteresis characteristics and which generates an output signal corresponding to an output signal from the time constant circuit.

According to the present invention, power source voltage change may be correctly discriminated by the CR time constant circuit and the Schmitt circuit.

DETAILED DESCRIPTION OF THE PREFERRED EMBODIMENTS

Figure 1:
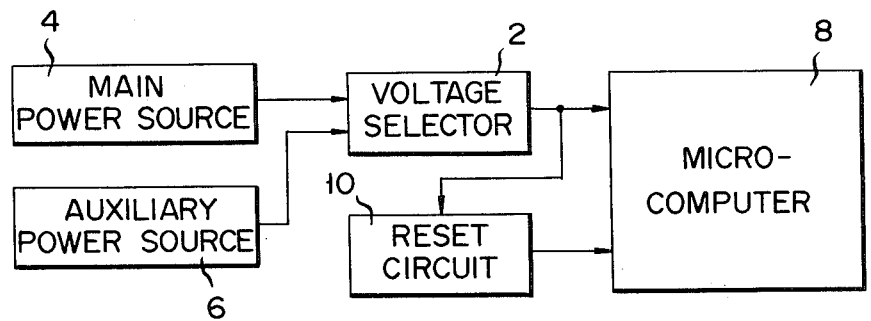
FIG. 1 is a circuit diagram of a microcomputer system including a conventional power source voltage change discrimination circuit.
Figure 2:
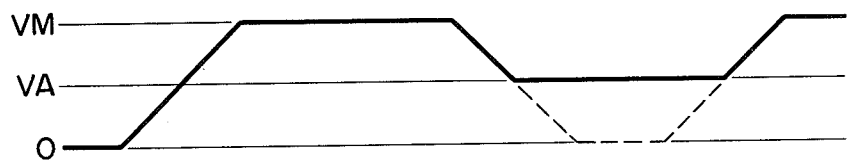
FIG. 2 shows a waveform for explaining the operation of the system shown in FIG. 1.
Figure 3:
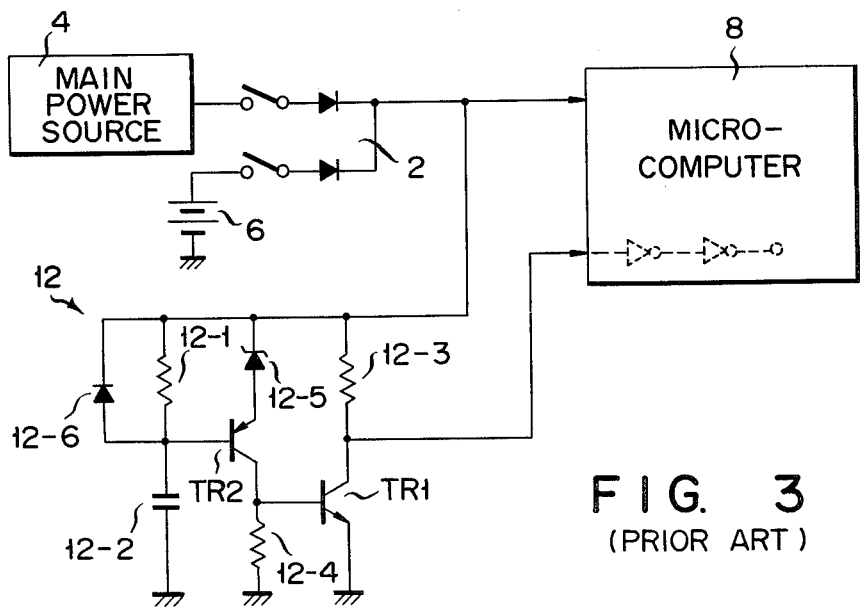
FIG. 3 is a circuit diagram of a microcomputer system including a power source voltage change discrimination circuit which is improved over the power source voltage change discrimination circuit shown in FIG. 1.
Figure 4:
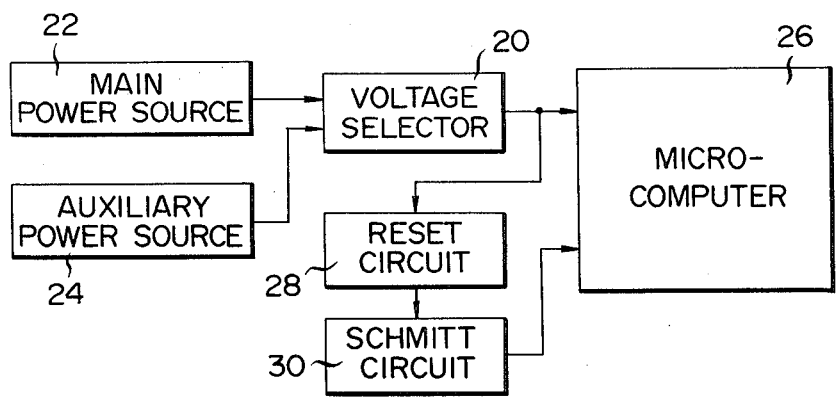
FIG. 4 is a block diagram of a microcomputer system including a power source voltage change discrimination circuit according to an embodiment of the present invention.

FIG. 4 shows a microcomputer system including a power source voltage change discrimination circuit according to an embodiment of the present invention. The power source voltage change discrimination circuit has a voltage selector 20 which selectively supplies voltages from a main power source 22 and an auxiliary power source 24 to the power source terminal of a microcomputer 26; a reset circuit 28 which generates an output voltage corresponding to the output voltage from the voltage selector 20; a Schmitt circuit 30 which supplies to the microcomputer 26 a reset signal corresponding to the output voltage from the reset circuit 28.

Figure 5:
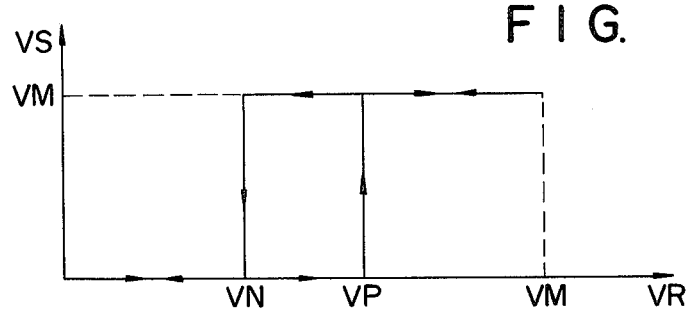
FIG. 5 is a graph showing the hysteresis characteristics of the Schmitt circuit used in the power source voltage change discrimination circuit shown in FIG. 4.

The input/output characteristics of the Schmitt circuit 30 have the hysteresis characteristics as shown in FIG. 5. An output voltage VS from the Schmitt circuit 30 is kept at a low level after the main power source 22 is turned on and until an output voltage VR from the reset circuit 28 gradually increases to exceed an upper level-shift voltage VP, and then it goes to a high level.

The Schmitt circuit 30 generates a signal of high level when the output voltage VR from the reset circuit 28 gradually decreases from the main power source voltage VM to reach a lower level-shift voltage VN. The Schmitt circuit 30 generates a signal of low level when the output voltage from the reset circuit 28 becomes still lower.

Figure 6:
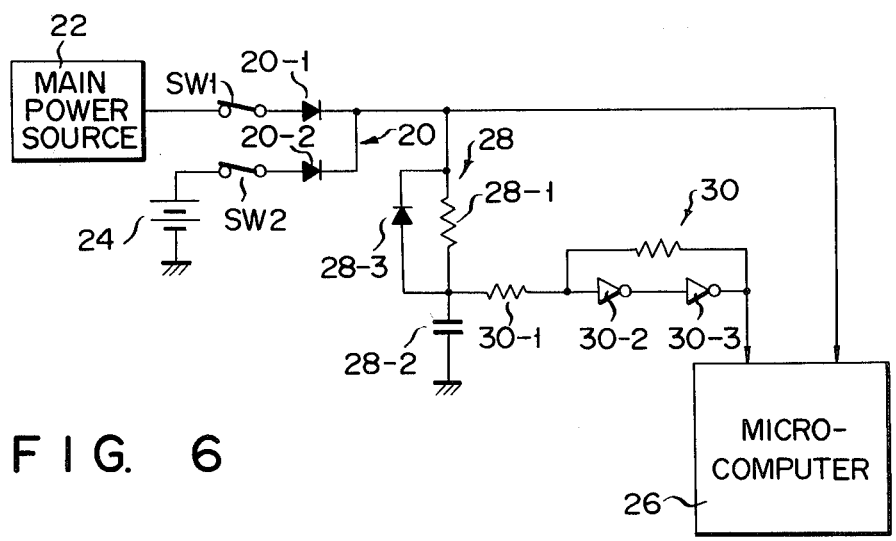
FIG. 6 is a circuit diagram of the power source voltage change discrimination circuit shown in FIG. 4.

FIG. 6 shows a circuit diagram of the microcomputer system shown in FIG. 4. Referring to FIG. 6, the main power source 22 and the auxiliary power source 24 are connected through switches SW1 and SW2, respectively, to diodes 20-1 and 20-2 constituting the voltage selector 20. A series circuit of a resistor 28-1 and a capacitor 28-2 constituting the reset circuit 28 is coupled between the output terminal of the voltage selector 20 and ground. A diode 28-3 is connected in parallel with the resistor 28-1. The junction of the resistor 28-1 and the capacitor 28-2 are coupled to the reset terminal of the microcomputer 26 through a resistor 30-1 and inverters 30-2 and 30-3 which constitute the Schmitt circuit 30. A feedback resistor 30-4 is coupled between the output terminal of the inverter 30-3 and the input terminal of the inverter 30-2.

Figure 8:
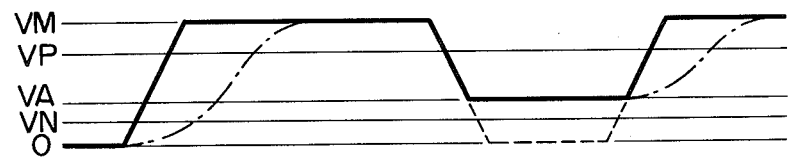
FIG. 8 is a view showing the signal waveform for explaining the mode of operation of the power source voltage change discrimination circuit shown in FIG. 6.
Figure 9:
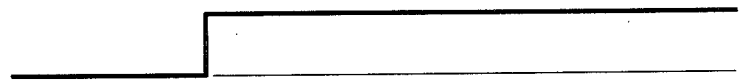
FIG. 9 is a view showing the signal waveform of the output signal from the Schmitt circuit shown in FIG. 6.

The mode of operation of the circuitry shown in FIG. 6 will now be explained with reference to FIGS. 7 to 9.

Figure 7:
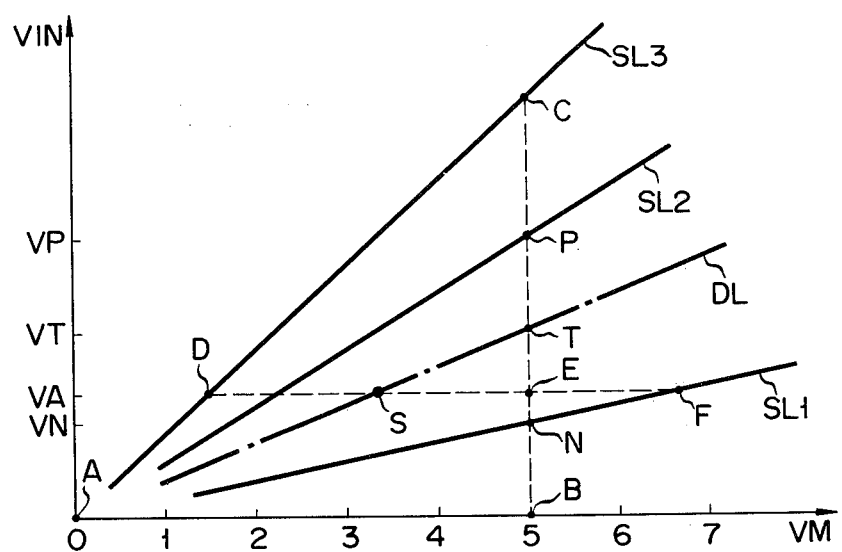
FIG. 7 is a graph showing the characteristics of the Schmitt circuit shown in FIG. 6 for explaining the operation thereof.

Referring to FIG. 7, solid line SL1 represents the relationship between the main power source voltage VM and the voltage level at which the output voltage from the Schmitt circuit 30 is level-shifted, when an input voltage VIN to the Schmitt circuit 30 decreases from the main power source voltage VM to 0 V. Solid line SL2 represents the relationship between the main power source voltage VM and the voltage level at which the output voltage from the Schmitt circuit 30 is level-shifted when the input voltage VIN to the Schmitt circuit 30 increases from 0 V to the main power source voltage VM. Solid line SL3 represents the relationship when VIN=VM.

If the input voltage VIN to the Schmitt circuit 30 is within the region below the solid line SL1, the output voltage from the Schmitt circuit 30 is set at a low level. If the input voltage VIN is within the region bounded by solid lines SL2 and SL3, the output voltage from the Schmitt circuit 30 is set at a high level. The region bounded by the solid lines SL1 and SL2 is the hysteresis region, and when the input voltage VIN changes from high level to the level of this region, the output voltage from the Schmitt circuit 30 is set at a high level. If the input voltage changes from low level to the level of this region, the output voltage from the Schmitt circuit 30 is set at a low level. Again referring to FIG. 7, dash-dot line DL represents the relationship between the main power source voltage VM and the voltage level at which the output voltage from a buffer circuit (not shown) having no hysteresis characteristics is level-shifted.

Assume that the switches SW1 and SW2 are closed. In this case, as indicated by the solid line in FIG. 8, the operation voltage supplied to the microcomputer 26 abruptly rises from 0 V to the main power source voltage VM, for example, 5 V. On the other hand, the input voltage to the Schmitt circuit 30, that is, the charging voltage of the capacitor 28-2, gradually increases as indicated by the dash-dot line in FIG. 8. That is, in FIG. 7, the operation point shifts from point A toward point B.

After the operation voltage supplied to the microcomputer 26 reaches the main power source voltage VM, the operation point shifts from point B toward point C. In this case, when the operation point reaches an upper level-shift point P, that is, when the input voltage to the Schmitt circuit 30 reaches a predetermined voltage VP, the Schmitt circuit 30 generates an output voltage of high level as shown in FIG. 9. Then, the effective reset signal from the Schmitt circuit 30 to the microcomputer 26 is terminated, and the setting of the initial state of the microcomputer 26 is completed. The microcomputer 26 then executes a desired data processing operation. Thereafter, the operation point shifts from point p to point C. The capacitor 28-2 is charged to the main power source voltage VM, and the main power source voltage VM is supplied to the Schmitt circuit 30.

If the voltage supply from the main power source 22 is interrupted for some reason under this operating condition, the capacitor 28-2 is gradually discharged. Since the output voltage from the voltage selector 20 is equal to the charging voltage of the capacitor 28-2 in this case, the operation point shifts along a line connecting points C and D and reaches point D to stop. Thus, the charging voltage of the capacitor 28-2 decreases to the auxiliary power source voltage VA and is kept at this value. Under this condition, an output voltage of high level is generated by the Schmitt circuit 30.

When the main power source voltage VM is restored thereafter, the output voltage from the voltage selector 20 abruptly increases from the voltage VA to the voltage VM. At the same time, the capacitor 28-2 is gradually charged from the voltage VA to the voltage VM. Therefore, in this case, the operation point shifts from point D to point E and then toward point C. Under this condition, the output voltage from the Schmitt circuit 30 is kept at a high level. Consequently, even if the operation point passes the upper level-shift point P, the output voltage from the Schmitt circuit 30 does not change and the reset signal is not generated by the Schmitt circuit 30.

According to the present invention, the lower level-shift voltage VN is set to be smaller than the auxiliary power source voltage VA, and undesirable generation of the reset signal by the Schmitt circuit 30 may be well prevented when the power source voltage is changed from the voltage VA to the voltage VM.

If the Schmitt circuit 30 is not used, the level-shift voltage is determined to form the dash-dot line DL in FIG. 7. That is, if the main power source voltage VM of 5 V is used, the level-shift voltage is set to voltage VT corresponding to point T. When the main power source 22 is turned on, the operation point shifts from point B to point C. In this case, the effective reset signal is generated by the reset circuit 28 for a period of time during which the operation point shifts from point B to point T. However, since this period of time is shorter than the time required for the working point to shift from point B to point P, it is required to have a greater CR time constant which is determined by the resistor 28-1 and the capacitor 28-2 in order to guarantee sufficient resetting time for resetting the microcomputer 26. When the main power source 22 is restored, the operation point passes the level-shift point S during the time of shift from point D to point E. Then, the reset signal is generated for a period of time during which the operation point shifts from point S to point T through point E. This period of time becomes longer when the CR time constant which is determined by the resistor 28-1 and the capacitor 28-2 is longer.

According to the present invention, hysteresis characteristics (B to P and C to N) are utilized which are obtained when the input voltage changes while the power source voltage of the Schmitt circuit is kept constant, in addition to hysteresis characteristics (DEF) which are obtained when the input voltage is kept constant while the power source voltage is changed. With this configuration, the reset signal can be generated when the power source voltage increases from 0 V, but the reset signal is not generated when the power source voltage increases from the auxiliary power source voltage VA.

In this manner, whether the main power source 22 is turned on or whether the main power source voltage is restored from the auxiliary power source voltage may be correctly discriminated by simply incorporating the CR time constant circuit and the Schmitt circuit 30. Therefore, the parts which must be externally attached to the microcomputer 26 may be greatly reduced in number and the system cost may be reduced to the minimum.

The present invention has been described with reference to its particular embodiment. However, the present invention is by no means limited to this. For example, in the embodiment described above, the resistor 28-1 is connected to the power source side and the capacitor 28-2 is connected to ground side, so that the reset signal may be generated when the voltage of low level is supplied to the Schmitt circuit 30. However, it is also possible to connect the resistor 28-1 at the ground side and the capacitor 28-2 at the power source side, so that the reset signal may be generated when the voltage of high level is received by the Schmitt circuit 30.

Furthermore, in the embodiment described above, the reset signal is generated for setting the microcomputer 26 to the initial state. However, it is also possible to use the output signal from the Schmitt circuit 30 for other purposes.

What we claim is:

1. A power source voltage change discrimination circuit comprising:
    a main power source terminal to which is applied a main power source voltage;
    a reference power source terminal to which is applied a constant reference voltage;
    an auxiliary power source terminal to which is applied an auxiliary power source voltage of a level between levels of the main power source voltage and the reference voltage;
    voltage selecting means connected to said main power source terminal and said auxiliary power source terminal for selecting the higher voltage of the main and auxiliary power source voltages supplied to said main and auxiliary power source terminals, respectively;
    delay means connected to an output terminal of said voltage selecting means for generating an output voltage which is kept substantially constant for a preset period of time after an output voltage from said selecting means is changed, and then becomes equal to the output voltage of said selecting means; and
    a Schmitt circuit connected to said delay means for generating an output signal corresponding to an output signal from said delay means, said Schmitt circuit having hysteresis characteristics to prevent a change in the output signal of the Schmitt circuit when an output voltage of said voltage selecting means is changed while the input voltage to said Schmitt circuit is kept above the lower level-shift voltage of the Schmitt circuit.

2. A power source voltage change discrimination circuit according to claim 1, wherein said Schmitt circuit has a first resistor, one end of which is coupled to a junction between said resistive means and said capacitive means; an amplifying circuit whose input terminal is coupled to the other end of said first resistor; and a second resistor coupled between input and output terminals of said amplifying circuit.

3. A power source voltage change discrimination circuit according to claim 2, wherein said amplifying circuit includes an even number of inverters connected in series.

4. A power source voltage change discrimination circuit according to claim 1, 2 or 3, wherein said voltage selecting means includes two diodes whose anodes are coupled to said main and auxiliary power source terminals, respectively, and whose cathodes are commonly connected.

5. A power source voltage change discrimination circuit according to claim 1, 2 or 3, wherein said Schmitt circuit inverts a level of an output voltage therefrom when an output voltage from said voltage selecting means which has been kept lower than a lower level-shift voltage between the levels of the auxiliary power source voltage and the reference voltage rises to cause an input voltage to said Schmitt circuit to be higher than an upper level-shift voltage between the levels of the main and auxiliary power source voltages, said Schmitt circuit being prevented from inverting a level of an output voltage therefrom when an output voltage from said voltage selecting means rises from a voltage level above said lower level-shift voltage.

6. A power source voltage change discrimination circuit according to claim 1, wherein said delay means is a time constant circuit including resistive means and capacitive means which are connected in series between an output terminal of said voltage selecting means and said reference power source terminal.

* * * * *